United States Patent Office 2,800,492
Patented July 23, 1957

2,800,492

EXTRACTION OF BOLEKO OIL

Pol Clément Jules Lambert, Haine-St.-Pierre, Belgium, assignor to Union Chimique Belge, S. A., Brussels, Belgium, a corporation of Belgium No Drawing. Application May 9, 1955, Serial No. 507,121

Claims priority, application Belgium June 19, 1954

5 Claims. (Cl. 260—412.2)

Boleko oil is obtained from kernels of trees *Onguekoa klaineana* Pierre or *Onguekoa Gore* Engler growing in the tropical and equatorial regions. The fatty acids forming triglycerides contain about 50% of isanic acid and 40% of isanolic acid.

The present invention relates to a process for the selective extraction of the two principal constituents of the boleko oil, and consists in two successive extractions, the first of which is effected by means of hydrocarbons boiling below 75° C., and the second by means of chlorinated or oxygenated solvents. The liquid of the first extraction contains, in the form of glycerides, the greater part of the isanic acid and a smaller quantity of isanolic acid. On the other hand, the liquid of the second extraction contains a greater proportion of isanolic acid.

The process according to the present invention may be applied both to the treatment of the kernels and to the separation of the oil obtained by pressing. However, it is to be noted that the yield is better when the kernels are directly extracted. Indeed, it is difficult to avoid a high temperature during the pressing of the kernels and a consequence of this fact is a more or less considerable deterioration of the boleko oil.

For the first extraction, a hexane, a pentane or a butane, or mixtures of aliphatic hydrocarbons such as for example, petroleum ethers, may be used. It has been found that it is convenient to effect the first extraction at a temperature of about 15° C. in order to obtain a mixture having a low isanolic acid content and a high isanic acid content. The operation takes place under pressure when volatile hydrocarbons such as butane are used.

For the second extraction, the choice of the solvent is not so critical, but it is advantageous to use a compound whose boiling point is not too high, whereby the separation of the extracted products is facilitated. Therefore, ethyl ether, methyl chloride, methylene chloride, chloroform, acetone, carbon tetrachloride, isopropanol, or the like, is preferably used. This second extraction takes place with advantage at a temperature of about 35° C.

By subjecting the extracted products to a further selective extraction, the isanic acid and isanolic acid contents may be increased.

The apparatus for the extractions depends obviously upon the particular conditions and chiefly upon the quantities to be treated. Naturally, the invention is independent of the type of apparatus used.

One of the advantages of the present invention is the production of an oil rich in isanic acid of high stability, which permits treatments impossible with raw boleko oil.

Before the selective extraction, the kernels may be treated with methanol. This supplementary extraction is requisite when the kernels are damaged to some extent after an inadequate storage.

Generally speaking, the solvents must be as anhydrous as possible, since it has been observed that the presence of water reduces the yields of the operations and the quality of the products obtained.

Example 1

500 gr. of grated Onguekoa kernals are introduced into a Soxhlet apparatus. The extraction is effected by means of hexane at a temperature between 15° and 20° C. After 15 hours, the extraction is stopped, the solvent is distilled off and 160 gr. of limpid yellow oil of relatively low viscosity (500 cp. at 20° C.) are recovered. This oil is thoroughly stable, its coloration and its acid value do not change after heating for two hours at 100° C. It can be kept for several months at room temperature without any modification. The hydroxyl value of this oil is equal to 50-55.

The residue of the first extraction is thereafter treated with acetone in a tepid solvent Soxhlet apparatus. The temperature may reach 35-40° C. After evaporation of the solvent, 150 gr. of a reddish, limpid, viscous oil (900 cp. at 20° C.) are recovered. The stability is substantially the same as that of the raw boleko oil. The hydroxyl value of the oil of this second extraction is equal to 110-115.

Example 2

The deterioration of Onguekoa kernels causes a red coloration of the flesh. In addition, the oil extracted by the known methods is dark and sometimes turbid.

Damaged kernels are treated with methanol for 48 hours in the cold (15-20° C.) afterwards the treatment of Example 1 is applied. The oils obtained are substantially the same as those extracted from well preserved kernels.

Example 3

A boleko oil obtained by pressing, which was blackish, turbid and very viscous, was treated in the following manner:

536 gr. of this oil are introduced into an extractor for liquids in which methanol at 15-20° C. flows. The solvent dissolves slightly in the oily phase of which no appreciable variation of volume is observed. After distillation and recovery of the solvent of the extraction, 80 gr. of a viscous orange oil also containing non-lipoidic substances remain.

After this first treatment, the oil is extracted with petroleum ether. The volume of the oily phase first increases to about four times its initial value. At this moment, decanting occurs suddenly and the solvent constituting the light phase separates off at the same time as a triglyceride having a high isanic acid content. The extraction is continued for 6 hours. After distillation of the petroleum ether, 159 gr. of a limpid orange oil having nearly the same characteristics as in Example 1 (viscosity=550 cp. at 20° C.; hydroxyl value=55–60) are obtained.

The extraction by means of ethyl ether gives 205 gr. of a reddish oil which closely resembles that of Example 1 (viscosity=950 cp. at 20° C.; hydroxyl value =110).

I claim:

1. A process for the extraction of boleko oil comprising two successive extractions, the first extraction being effected at a temperature within the range from about 15° to about 20° C. by means of a solvent having a boiling point lower than 75° C. and selected from the group consisting of hexane and petroleum ether, and the second extraction being effected at a temperature within the range from about 35° to about 40° C. by means of a solvent selected from the group consisting of acetone and ethyl ether.

2. A process according to claim 1, wherein the extractions are applied to Onguekoa kernels.

3. A process according to claim 2, wherein the Onguekoa kernels are subjected to a preliminary conditioning treatment with methanol in the cold.

4. A process according to claim 1, wherein the boleko oil is subjected to a preliminary conditioning treatment with methanol in the cold.

5. A process for the extraction of boleko oil comprising two succesive extractions, the first extraction being effected at a temperature within the range from about 15° to about 20° C. by means of hexane, and the second extraction being effected at a temperature within the range from about 35° to about 40° C. by means of ethyl ether.

No references cited.